(12) United States Patent
Faden (10) Patent No.: US 7,885,975 B2
(45) Date of Patent: *Feb. 8, 2011

(54) MECHANISM FOR IMPLEMENTING FILE ACCESS CONTROL USING LABELED CONTAINERS

(75) Inventor: Glenn T. Faden, San Rafael, CA (US)

(73) Assignee: Oracle America, Inc., Redwood City, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 11/361,437

(22) Filed: Feb. 23, 2006

(65) Prior Publication Data

US 2007/0220001 A1 Sep. 20, 2007

(51) Int. Cl.
*G06F 7/00* (2006.01)
*G06F 17/30* (2006.01)

(52) U.S. Cl. ...................................................... 707/786
(58) Field of Classification Search ........................ None
See application file for complete search history.

(56) References Cited

U.S. PATENT DOCUMENTS

| | | | |
|---|---|---|---|
| 5,325,526 A | 6/1994 | Cameron et al. |
| 5,437,032 A | 7/1995 | Wolf et al. |
| 5,590,314 A | 12/1996 | Ueno et al. |
| 5,784,706 A | 7/1998 | Oberlin et al. |
| 5,841,869 A | 11/1998 | Merkling et al. |
| 5,845,116 A | 12/1998 | Saito et al. |
| 5,963,911 A | 10/1999 | Walker et al. |
| 6,006,228 A | 12/1999 | McCollum et al. |
| 6,064,811 A | 5/2000 | Spilo et al. |
| 6,074,427 A | 6/2000 | Fought et al. |
| 6,075,938 A | 6/2000 | Bugnion et al. |
| 6,279,046 B1 | 8/2001 | Armstrong et al. |
| 6,289,462 B1 | 9/2001 | McNabb et al. |
| 6,292,900 B1 | 9/2001 | Ngo et al. |
| 6,438,594 B1 | 8/2002 | Bowman-Amuah |
| 6,557,168 B1 | 4/2003 | Czajkowski |
| 6,633,963 B1 | 10/2003 | Ellison et al. |
| 6,681,238 B1 | 1/2004 | Brice, Jr. et al. |

(Continued)

FOREIGN PATENT DOCUMENTS

EP 1043658 A1 10/2000

(Continued)

OTHER PUBLICATIONS

Zadok et al., "A Stackable File System Interface for Linux", In Proceedings of the 5th Annual Linux Expo, 1999.*

(Continued)

*Primary Examiner*—Michael J Hicks
(74) *Attorney, Agent, or Firm*—Osha • Liang LLP (57) ABSTRACT

A mechanism is disclosed for implementing file access control using labeled containers. With this mechanism, it is possible to implement file access control without storing a sensitivity label with each file, and without checking a sensitivity label each time a file is accessed. Rather, by virtue of the manner in which the containers are labeled, and the manner in which a portion of the file system of one container is incorporated into the file system of another container, file access is effectively controlled. Thus, with this mechanism, it is possible to implement file access control simply and efficiently.

20 Claims, 7 Drawing Sheets

U.S. PATENT DOCUMENTS

| | | |
|---|---|---|
| 6,681,258 B1 | 1/2004 | Ratcliff et al. |
| 6,701,460 B1 | 3/2004 | Suwandi et al. |
| 6,725,457 B1 | 4/2004 | Priem et al. |
| 6,792,514 B2 | 9/2004 | Kapoor et al. |
| 6,859,926 B1 | 2/2005 | Brenner et al. |
| 6,944,699 B1 | 9/2005 | Bugnion et al. |
| 6,957,435 B2 | 10/2005 | Armstrong et al. |
| 6,993,762 B1 | 1/2006 | Pierre |
| 7,051,340 B2 | 5/2006 | Fisher et al. |
| 7,076,634 B2 | 7/2006 | Lambeth et al. |
| 7,095,738 B1 | 8/2006 | Desanti |
| 7,096,469 B1 | 8/2006 | Kubala et al. |
| 2002/0083367 A1 | 6/2002 | McBride et al. |
| 2002/0120660 A1 | 8/2002 | Hay et al. |
| 2002/0124072 A1 | 9/2002 | Tormasov et al. |
| 2002/0156824 A1 | 10/2002 | Armstrong et al. |
| 2002/0173984 A1 | 11/2002 | Robertson et al. |
| 2002/0174215 A1 | 11/2002 | Schaefer |
| 2003/0014466 A1 | 1/2003 | Berger et al. |
| 2003/0069939 A1 | 4/2003 | Russell |
| 2003/0167269 A1 | 9/2003 | Gupta |
| 2004/0010624 A1 | 1/2004 | Garofalo et al. |
| 2004/0015701 A1 | 1/2004 | Flyntz |
| 2004/0162914 A1 | 8/2004 | St. Pierre et al. |
| 2004/0187020 A1 | 9/2004 | Leerssen et al. |
| 2004/0210760 A1 | 10/2004 | McGrath et al. |
| 2004/0215848 A1 | 10/2004 | Craddock et al. |

FOREIGN PATENT DOCUMENTS

| | | |
|---|---|---|
| EP | 1 253 516 A2 | 10/2002 |
| EP | 1282038 A2 | 2/2003 |
| EP | 1300766 A2 | 4/2003 |
| GB | 2301912 A | 12/1996 |
| WO | WO 00/45262 A2 | 8/2000 |

OTHER PUBLICATIONS

Zadok et al., "FiST: A Language for Stackable File Systems", Proceedings of the Annual USENIX Technical Conference, pp. 55-70, 2000.*

Sun Microsystems, Inc., Part No. 817-6064-01 entitled, "System Administration Guide: Solaris Containers, Resource Management, and Zones" (246 pgs) dated Feb. 2004.

Mc Dougall, Richard, et al., "Resource Management", Prentice Hall, 1999, 25 pages.

Poul-Henning Kamp et al. "Jails: Confining SANE 2000", May 22-25, 2000.

Comm from the ACM ISNN 0001 to 0782 vol. 44 Issue 2, 2001 entitled "Operating System Approach Dalton, Choo" ACM Copyright 2001.

Sun Microsystems "Server 8 Operating Environment", Glenn Faden, Online, Feb. 2002.

Network Working Group entitled "IP Vers. 6 Addressing Architecture" by R. Hiden, Nokia Deering, Cisco dtd Jul. 1998.

IBM entitled "Partitioning for the IBM eserver pSeries 690 System", Copyright IBM 2001.

IBM System Partitioning on IBM eserver xSeries Servers and entitled "Effective Server Conso. Reserve Mgmt w/ IBM System" by Mark Chapman, dtd Dec. 2001.

Virtual Private Servers and Security Contexts dtd May 10, 2004.

SunSoft, A Sun Microsystems Inc Business entitled "File System Administration" 1994 Sun Microsystems.

European Patent Office, "European Search Report" from the for Foreign Patent Application No. 04252690.5, Aug. 31, 2004, (3 pgs.).

Claims As Filed in European Patent Application No. 04252690.5, (6 pgs.).

Overview of Bandwidth Broker System [online], [retrieved on Jan. 31, 2005]. Retrieved from the internet: <URL: http://www.ittc.ku.edu/~kdrao/845/into.html>, (19 pgs).

Qbone Signaling Design Team Final Report [online], [retrieved on Jan. 31, 2005]. Retrieved from the internet: <URL: http://qos.internet2.edu/wg/documents-informational/20020709-chimento-etal-qbone-signaling.>, (33 pgs).

Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.

European Patent Office, "European Search Report," App. No. 04252688.9, dated Dec. 21, 2006, 4 pages.

Current Claims, App. No. 04252688.9, 5 pages.

State Intellectual Property Office of P.R.C, "Second Office Action," application No. 200410063136.3, mailing date Jun. 1, 2007, 4 pages.

Current Claims, Foreign patent application 200410063136.3, 10 pages.

"CHMOD—Change the Permission Mode of a File," Internet Citation, Dec. 4, 2000, XP007901399, Retrieved from the internet at: http://www.cse.msu.edu/cgi-bin/man2html?chmod?1?/usr/man, retrieved in Dec. 4, 2006, 7 pages.

"SETFACL—Modify the Access Control List (ACL) for a File or Files," Internet Citation, Dec. 11, 2001, XP007901398, Retrieved from the Internet at: http://www.cse.msu.edu/cgi-bin/man2html?setfacl?1?/usr/man, retrieved on Dec. 4, 2006, 4 pages.

* cited by examiner

MECHANISM FOR IMPLEMENTING FILE ACCESS CONTROL USING LABELED CONTAINERS

BACKGROUND

In many computer implementations, it is desirable to limit access to files based upon accessibility level. This is especially true in a government context. For example, in a government security implementation, it is quite desirable, and most likely required, for top secret files to be accessible only by users and processes having the proper clearance level (e.g. top secret clearance or above). It may also be desirable for users and processes having high clearance levels to be able to access files at lower levels (e.g. users and processes with top secret clearance can access need-to-know and public files). In order to implement such controls, some mechanism needs to be put in place to check the clearance levels of the users, processes, and files, and to determine whether certain accesses should be allowed. One such mechanism may be an operating system.

Currently, in order to implement such file access control, sensitivity labels need to be associated and stored with each file. When an access of a file is requested by a user or process, the sensitivity label of the file is checked against the sensitivity level of the user or process, and based upon that check, a decision is made as to whether to allow or deny the requested access.

This approach has several drawbacks. One drawback is that it requires a customized file system in order to work. Most standard file systems do not allow sensitivity labels to be associated and stored with each file. Thus, only a customized file system that allows sensitivity labels to be stored with each file can be used with this approach. Also, this approach requires that the sensitivity label of a file be checked each and every time that file is accessed. This imposes additional overhead on the system, which may degrade system performance. Because of these and potentially other drawbacks, this approach does not provide wholly satisfactory results. Consequently, an improved mechanism for enforcing file access control is needed.

SUMMARY

In accordance with one embodiment of the present invention, there is provided a mechanism for implementing file access control which does not require a sensitivity label to be associated and stored with each file. Rather, file access control is achieved through the use of labeled containers.

In one embodiment, one or more containers may be established within a global operating system environment. Each container, which for example may be an operating system partition (also referred to herein as a non-global zone), represents a separate virtual operating environment. Each container has its own file system. Each container also acts as a process isolation mechanism for isolating processes executing within that container from processes executing in other containers. Given these two aspects of a container, the processes executing within a container can access only the files and directories that are part of the file system for that container. The processes in a container are generally unaware of the file systems of other containers.

In addition to having its own file system, each container also has its own unique sensitivity label. In one embodiment, each sensitivity label comprises a portion that specifies a sensitivity level, and a portion that specifies a category. The sensitivity level specifies where, in a sensitivity hierarchy, a particular container falls. For example. one container may have a sensitivity level that corresponds to "top secret" while another container may have a sensitivity level that corresponds to "need-to-know", which is lower than "top secret". The category portion specifies the matter to which the container pertains. For example, the category portion may specify a country (e.g. Iraq, Egypt, etc.), a particular matter (e.g. Iran Contra), etc. Together, the sensitivity level portion and the category portion form an overall unique sensitivity label for each container (e.g. "top secret Iraq", "need-to-know Egypt", etc.). These sensitivity labels may be used to determine whether one container dominates another.

Given the container characteristics set forth above, file access control may be implemented as follows. Suppose that a first container is being established in a global operating system environment. When the first container is created, it is assigned a first sensitivity label. A first file system is also associated with the first container. As part of the container establishment process, a determination is made as to whether there are any other containers in the global operating system environment that are dominated by the first container. The first container dominates another container if the first sensitivity label of the first container dominates the sensitivity label of the other container. In one embodiment, the first sensitivity label dominates the other sensitivity label if: (1) the first sensitivity label has a higher sensitivity level than the other sensitivity label; and (2) both sensitivity labels have the same category portion. For example, "top secret Iraq" dominates "need-to-know Iraq" but it does not dominate "need-to-know Egypt" because, even though it has a higher sensitivity level, it has a different category. For the sake of example, it will be assumed that a second container already exists in the global operating system environment, and that the second container has a second sensitivity label and a second file system associated therewith. It will further be assumed that the second sensitivity label is dominated by the first sensitivity label of the first container. In such a case, it is determined that the second container is dominated by the first container. In response to this determination, a particular portion of the second file system of the second container is incorporated into the first file system of the first container (this particular portion may be a portion of the second file system that has been designated as being exportable to higher level containers). This incorporation may be done, for example, by mounting the particular portion of the second file system onto a particular mount point in the first file system. By doing so, the particular portion of the second file system is made accessible to the processes executing within the first container. In effect, file access control is enforced because the files and directories of the second file system (which have a lower sensitivity level) are made accessible to the processes of the first container (which have a higher sensitivity level).

In one embodiment, as a further part of the container establishment process, a further determination is made as to whether there are any other containers in the global operating system environment that dominate the first container. For the sake of example, it will be assumed that a third container already exists in the global operating system environment, and that the third container has a third sensitivity label and a third file system associated therewith. It will be further assumed that the third sensitivity label dominates the first sensitivity label of the first container. In such a case, it is determined that the third container dominates the first container. In response to this determination, a certain portion of the first file system of the first container is incorporated into the third file system of the third container (this certain portion may be a portion of the first file system that has been designated as being exportable to higher level containers). Again, this incorporation may be done, for example, by mounting the certain portion of the first file system onto a particular mount point in the third file system. By doing so, the certain portion of the first file system is made accessible to the processes executing within the third container. In effect, file access control is enforced because the files and directories of the first file system (which have a lower sensitivity level) are made accessible to the processes of the third container (which have a higher sensitivity level).

Notice that implementing file access control in the above manner does not require a sensitivity label to be stored with each file. Rather, the sensitivity label is associated with a container, and is applied to all of the directories and files in the file system of that container. Thus, this file access control approach does not require a customized file system that allows a sensitivity label to be stored with each file but rather can be implemented with most standard types of file systems. Also, notice that the sensitivity labels are not checked every time a file is accessed but rather only at the time that a container is established. Because of this, system overhead is significantly reduced. Thus, with this approach, it is possible to implement file access control simply and efficiently.

DETAILED DESCRIPTION OF EMBODIMENT(S)

System Overview

Figure 1:
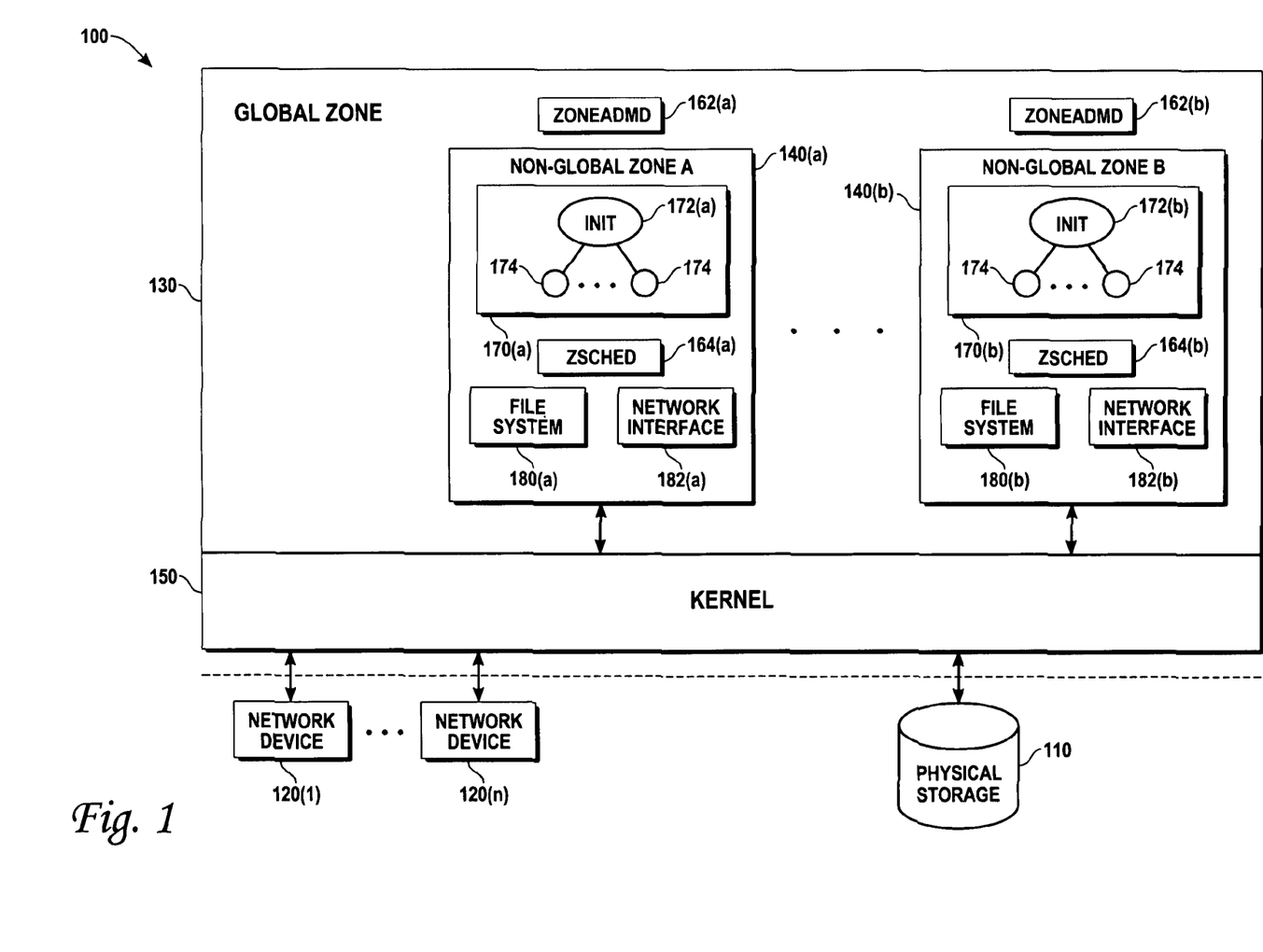
FIG. 1 shows a functional block diagram of a system in which one embodiment of the present invention may be implemented.

With reference to FIG. 1, there is shown a functional block diagram of a system in which one embodiment of the present invention may be implemented. In the system of FIG. 1, an operating system (OS) environment 100 is derived by executing an OS in a general-purpose computer system, such as computer system 500 illustrated in FIG. 5. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as operating system partitions), including a global zone 130 and zero or more non-global zones 140 (also referred to as containers). The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones or containers 140 represent separate and distinct partitions of the OS environment 100. Each non-global zone 140 provides a separate virtual operating environment. One of the purposes of the non-global zones 140 is to provide isolation. In one embodiment, a non-global zone 140 can be used to isolate a number of entities, including but not limited to processes 170, one or more file systems 180, and zero or more logical network interfaces 182. Because of this isolation, processes 170 executing in one non-global zone 140 cannot access or affect processes in any other zone. Similarly, processes 170 in a non-global zone 140 generally cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer.

Having non-global zones 140 that are isolated from each other may be desirable in many implementations. For example, if a single computer system running a single instance of an OS is to be used to host applications and file systems having different security levels, it may be desirable to isolate the data and processes so that sensitive information does not leak from one file system to another. Partitioning an OS environment 100 into non-global zones 140 and hosting the different applications and file systems in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150 of the OS. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but certainly are not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Sensitivity Labels

As noted previously, one of the purposes of the non-global zones 140 is to provide isolation to prevent the processes in one non-global zone from accessing the file system of another non-global zone. While such isolation is generally desirable, there may be implementations in which it is desirable to allow the processes in one non-global zone to access at least a portion of the file system of another non-global zone. For example, suppose that a non-global zone hosts a set of top secret processes and files while another non-global zone hosts a set of public processes and files. In such a case, it may be desirable to allow the top secret processes of the first zone to access at least a portion of the public files of the second zone. In one embodiment, to facilitate this cross-zone file access, each non-global zone 140 is assigned a unique sensitivity label.

In one embodiment, a sensitivity label comprises two portions: (1) a sensitivity level portion; and (2) a category portion. The sensitivity level portion specifies a sensitivity level for the non-global zone 140. This sensitivity level is one of the levels in a sensitivity hierarchy, and specifies where in that hierarchy the non-global zone belongs. For example, if the sensitivity hierarchy includes the levels of "top secret", "secret", "need-to-know", and "public", where "top secret" is the highest, then if a non-global zone 140 has a sensitivity level of "secret", it is known that that non-global zone 140 is higher than "need-to-know" and "public" but lower than "top secret". The sensitivity level portion of a sensitivity label may be common among a plurality of non-global zones 140. Thus, for example, more than one non-global zone 140 may have a sensitivity level of "secret".

The category portion of the sensitivity label may be used to specify some particular aspect of a non-global zone 140. For example, the category portion may specify a country (e.g. Iraq, Egypt, etc.) or some particular matter (e.g. Iran Contra) to which the information in the non-global zone 140 pertains. Like the sensitivity level portion, the category portion of a sensitivity label may be common among a plurality of non-global zones 140. Thus, for example, more than one non-global zone 140 may have a category of "Iraq".

While neither the sensitivity level portion nor the category portion in and of itself contains unique information, together, they form a unique sensitivity label for each non-global zone 140. Thus, for example, one non-global zone may have a sensitivity label of "top secret Iraq", while another may have a sensitivity label of "need-to-know Iraq", while another may have a sensitivity label of "need-to-know Egypt". In one embodiment, no two non-global zones 140 within the same global zone 130 have the same sensitivity label. In the above discussion, the sensitivity levels and categories are expressed in terms of words to best facilitate understanding; however, it should be noted that these portions may be expressed in any form (e.g. numbers, combination of numbers and text, etc.) that serve the same purposes.

Given the sensitivity labels for two non-global zones 140, it is possible to determine whether one non-global zone 140 dominates the other. Specifically, a first non-global zone dominates a second non-global zone if the sensitivity label of the first non-global zone (referred to as the first sensitivity label) dominates the sensitivity label of the second non-global zone (referred to as the second sensitivity label). In one embodiment, the first sensitivity label dominates the second sensitivity label if: (1) the first sensitivity label has a higher sensitivity level than the second sensitivity label; and (2) both the first and second sensitivity labels have the same category portion. Given these criteria, if the first sensitivity label is "top secret Iraq" and the second sensitivity label is "need-to-know Iraq", then the first sensitivity label dominates the second sensitivity label because the first sensitivity label has a higher sensitivity level ("top secret" is higher than "need-to-know") and both labels have the same category ("Iraq"). On the other hand, if the first sensitivity label is "top secret Iraq" and the second sensitivity label is "need-to-know Egypt", then there is no dominance because, even though the first sensitivity label has a higher sensitivity level, it has a different category ("Iraq" instead of "Egypt"). In such a case, the labels are said to be disjoint.

It should be noted that the above dominance criteria is just one of many ways for determining whether one sensitivity label dominates another. Other criteria may be used. For example, if so desired, the category portion of a sensitivity label may be ignored so that as long as a first sensitivity label has a higher sensitivity level than a second sensitivity label, the first sensitivity label is deemed to dominate the second sensitivity label. This and other ways of determining dominance may be used. All such criteria for determining dominance are within the scope of the present invention.

The significance of the dominance determination is that it determines whether the processes in a first non-global zone may be allowed to access at least a portion of the file system of a second non-global zone. Specifically, if the first non-global zone dominates the second non-global zone, then the processes in the first non-global zone may be allowed to access at least a portion of the file system of the second non-global zone. In one embodiment, to enable the processes in the first non-global zone to access the portion of the file system of the second non-global zone, the portion of the file system of the second non-global zone is incorporated into the file system of the first non-global zone. By doing so, the portion of the file system of the second non-global zone is made accessible to the processes in the first non-global zone without violating the isolation aspect of the non-global zones. Since the portion of the file system of the second non-global zone is now part of the file system of the first non-global zone, when the processes in the first non-global zone access the portion of the file system of the second non-global zone, they are really just accessing a portion of the file system of their own non-global zone; thus, the isolation aspect of the first non-global zone is preserved.

The above discussion provides just a brief overview of how the sensitivity labels may be used to enable cross-zone file access. A particular manner in which this may be achieved will be described in greater detail in a later section.

File System for a Non-Global Zone

As noted above, each non-global zone 140 has its own associated file system 180. This file system 180 is used by the processes 170 running within the associated zone 140, and generally cannot be accessed by processes 170 running within any other non-global zone 140 (although it can be accessed by a process running within the global zone 130 if that process has the appropriate privileges). To illustrate how a separate file system may be maintained for each non-global zone 140, reference will be made to FIGS. 3 and 4.

Figure 3:
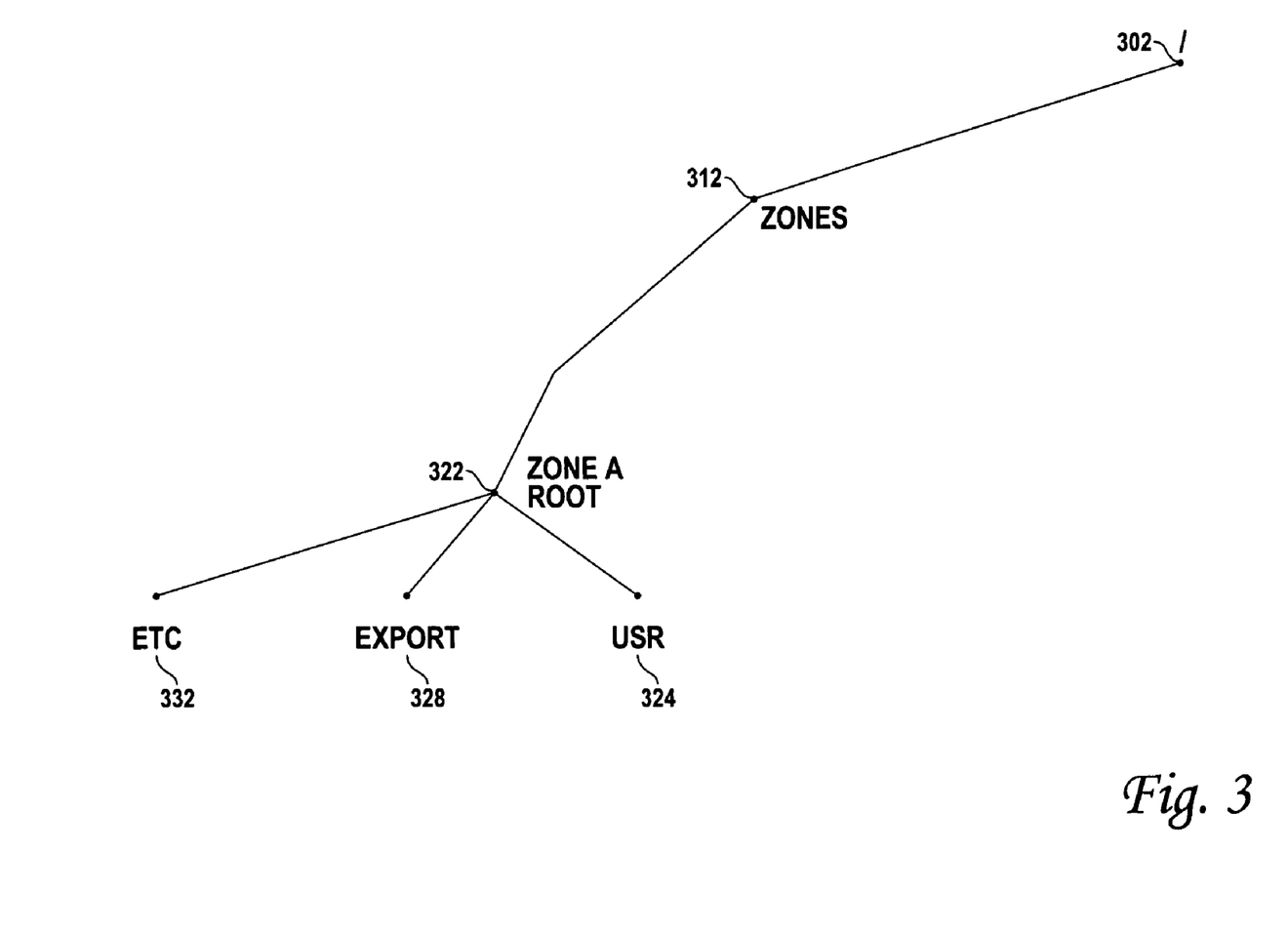
FIG. 3 shows, in tree form, an overall file system comprising a branch that represents a file system of a zone.

FIG. 3 shows, in tree format, a portion of an overall file system maintained by the kernel 150 for the global zone 130. This overall file system comprises a/directory 302, which acts as the root for the entire file system. Under this root directory 302 are all of the directories, subdirectories, files, and mounts of the overall file system.

As shown in FIG. 3, under the/directory 302 is a path to a root directory 322 of a file system 180 for a particular non-global zone 140. In the example shown, the path is /Zones/ZoneA Root (as seen from the global zone 130), and the non-global zone is zone A 140(a) (FIG. 1). This root 322 acts as the root of the file system 180(a) for zone A 140(a), and everything underneath this root 322 is part of that file system 180(a). Because root 322 is the root of the file system 180(a) for zone A 140(a), processes 170(a) within zone A 140(a) cannot traverse up the file system hierarchy beyond root 322 (the kernel 150 enforces this). Thus, processes 170(a) cannot see or access any of the directories above root 322, or any of the subdirectories that can be reached from those directories. To processes 170(a), it is as if the other portions of the overall file system did not exist.

Figure 4:
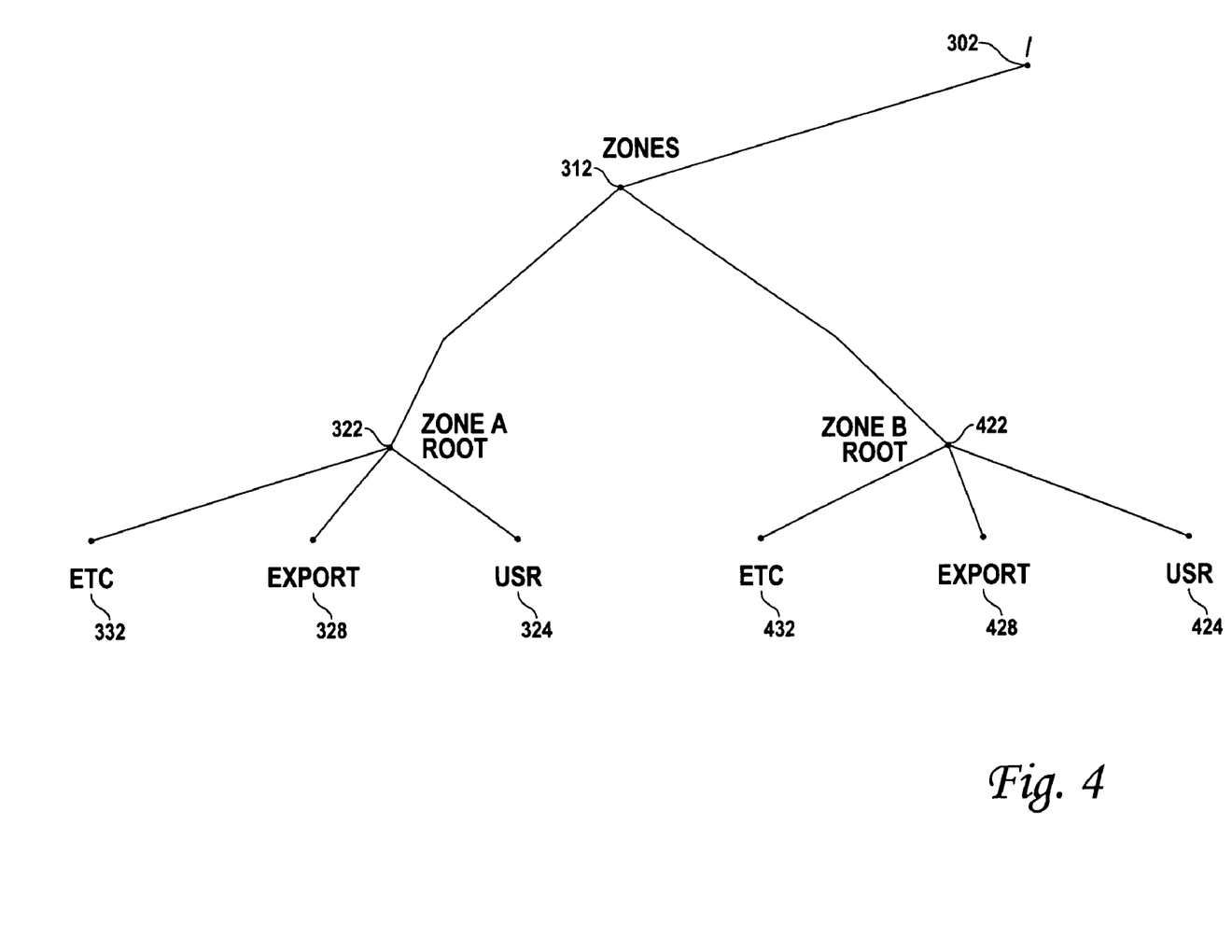
FIG. 4 shows, in tree form, an overall file system comprising two branches representing the file systems of two separate zones.

FIG. 4 shows the same overall file system, except that another file system for another non-global zone 140 has been added. In the example shown, the other non-global zone is zone B 140(b) (FIG. 1), and the path to the root 422 of the file system 180(b) for zone B 140(b) is /Zones/ZoneB Root. Root 422 acts as the root of the file system 180(b) for zone B 140(b), and everything underneath it is part of that file system 180(b). Because root 422 is the root of the file system 180(b) for zone B 140(b), processes 170(b) within zone B 140(b) cannot traverse up the file system hierarchy beyond root 422. Thus, processes 170(b) cannot see or access any of the directories above root 422, or any of the subdirectories that can be reached from those directories. To processes 170(b), it is as if the other portions of the overall file system did not exist. By organizing the file systems in this manner, it is possible to maintain, within an overall file system maintained for the global zone 130, a separate file system 180 for each non-global zone 140. It should be noted that this is just one way of maintaining a separate file system for each non-global zone. Other methods may be used, and all such methods are within the scope of the present invention.

The root of a non-global zone's file system may have any number of directories, subdirectories, and files underneath it. Using root 322 as an example, these directories may include some directories, such as ETC 332, which contain files specific to a zone 140(a) (for example, program files that are to be executed within the zone 140(a)), and some directories, such as USR 324, which contain operating system files that are used by the zone 140(a). The directories may also include an Export directory 328, which contains directories and files that can be exported to the file systems of other non-global zones with higher sensitivity levels. The significance of the Export directory 328 will be discussed in greater detail in a later section. These and other directories and files may be included under the root 322, or a subdirectory thereof.

The root of a non-global zone's file system may also have one or more mounts underneath it. Put another way, one or more mount points may exist under the root (or a subdirectory thereof), on which entities may be mounted. The mount points may be used to mount loop back file systems (LOFS), network file systems (NFS), or other types of file systems. Basically, any number of mount points, on which any type of file system may be mounted, may exist under the root of a non-global zone's file system.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, an sensitivity label, specification of zero or more mount points and entities to be mounted when the zone is readied, specification of zero or more network interfaces, specification of devices to be configured when the zone is created, etc.

Once a zone is in the Configured state, a global administrator may invoke another operating system utility (in one embodiment, zoneadm(1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a ZoneADMD process 162 to be started (there is a ZoneADMD process associated with each non-global zone). In one embodiment, ZoneADMD 162 runs within the global zone 130 and is responsible for managing its associated non-global zone 140. After ZoneADMD 162 is started, it interacts with the kernel 150 to establish the non-global zone 140. In establishing a non-global zone 140, a number of operations are performed. These operations include creating the non-global zone 140 (in one embodiment, this involves assigning a zone ID to the non-global zone 140, associating an sensitivity label with the zone, creating a zone data structure which will be used by the kernel 150 to enforce and manage zone boundaries and file access, establishing the path to the root directory of the zone as the root of the zone's file system 180, etc.). These operations may also include starting a zsched process 164 (zsched is a kernel process; however, it runs within the non-global zone 140, and is used to track kernel resources associated with the non-global zone 140), plumbing network interfaces 182, configuring devices, etc. In one embodiment, it is during this establishment process that sensitivity labels are checked, and portions of file systems of non-global zones are incorporated into the file systems of other non-global zones. This will be described in greater detail in a later section. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer.

After a non-global zone 140 is in the Ready state, it can be transitioned into the Running state by executing one or more user processes in the zone. In one embodiment, this is done by having ZoneADMD 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated ZoneADMD 162 can be used to manage it. ZoneADMD 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by ZoneADMD 162 to manage a non-global zone 140 on an ongoing basis during regular operation.

Establishment of File Access Control

As noted previously, it is during the establishment of a non-global zone 140 that sensitivity labels are checked and certain portions of file systems of non-global zones are incorporated into the file systems of other non-global zones. To illustrate how this is done in accordance with one embodiment of the present invention, reference will be made to an example.

Figure 2A:
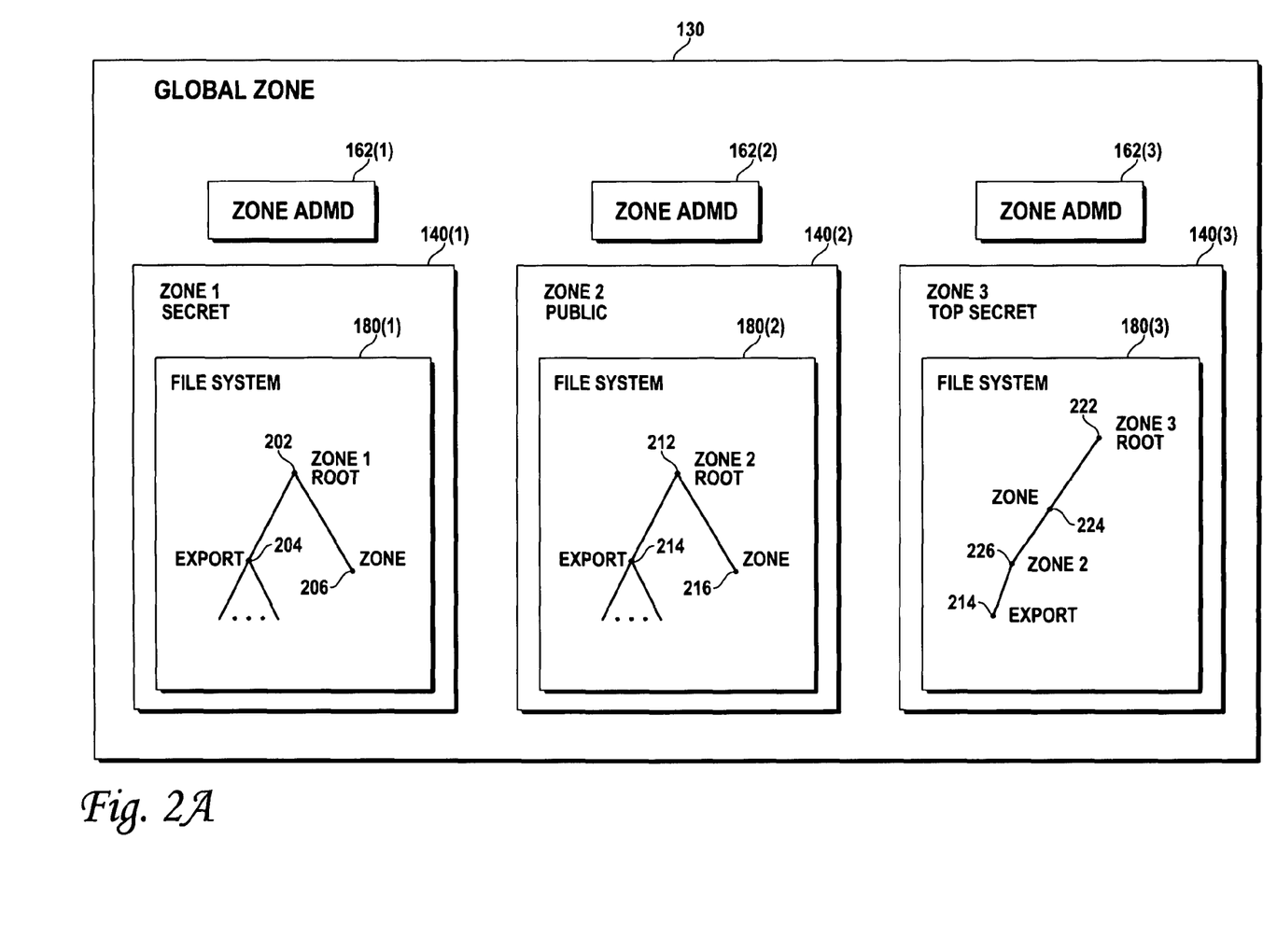
FIGS. 2A-2C show some sample file system of some sample zones to illustrate how file access control may be implemented in accordance with one embodiment of the present invention.

FIG. 2A shows a global zone 130 in which there are three non-global zones 140(1), 140(2), 140(3) (hereinafter, the non-global zones will be referred to as zones for the sake of brevity). Zones 140(2) and 140(3) are already established (i.e. they are in either the ready or running state). Zone 140(1) is about to be established (i.e. it is in the installed state). Zone 140(2) has a sensitivity label which is "public Iraq", zone 140(3) has an sensitivity label which is "top secret Iraq", and zone 140(1), which is about to be established, will have a sensitivity label which is "secret Iraq". Since they are already established, zones 140(2) and 140(3) have established file systems 180(2) and 180(3), respectively (for the sake of simplicity, only a portion of these file systems is shown in FIG. 2A). They also have currently executing ZoneADMD's 162(2) and 162(3) for managing them. Given this existing environment, the establishment of zone 140(1) will now be described.

Initially, zone 140(1) is in the Installed state. In this state, the zone 140(1) will have had all of the necessary files and directories already installed under its root directory. Thus, its file system 180(1) is already established. For the sake of example, it will be assumed that the file system 180(1) has a root 202 called Zone I Root, and that there is a Zone directory 206 and an Export directory 204 stemming from the root 202. The file system 180(1) may also have other directories, subdirectories, and files that are not shown in FIG. 2A. In one embodiment, the Export directory 204 contains all of the directories, subdirectories, and files that can be made accessible to processes of other zones with higher sensitivity levels. This naming convention is followed by all of the zones. Thus, the Export directory 214 in the file system 180(2) of zone 140(2) also contains all of the directories, subdirectories, and files that can be made accessible to processes of other zones with higher sensitivity levels.

To transition zone 140(1) from the Installed state into the Ready state, a global administrator invokes an operating system utility (in one embodiment, zoneadm(1 m)), which causes a ZoneADMD process 162(1) to be started. This ZoneADMD 162(1) runs within the global zone 130 and is responsible for establishing and managing zone 140(1). After ZoneADMD 162(1) is started, it interacts with the kernel 150 to establish zone 140(1). To do so, ZoneADMD 162(1) initially creates the zone 140(1). In one embodiment, this involves accessing the configuration information for the zone 140(1) (which was provided by the administrator when putting the zone into the Configured state). It further involves assigning an ID to the zone 140(1), assigning the sensitivity label specified in the configuration information to the zone 140(1), creating a zone data structure that will be used by the kernel 150 to enforce and manage zone boundaries and file access, establishing the path to the root directory 202 of the zone as the root of the file system 180, etc. In addition to creating the zone 140(1), the ZoneADMD 162(1) also performs other tasks, such as starting a zsched process (not shown) (zsched is a kernel process; however, it runs within the zone 140(1), and is used to track kernel resources associated with the zone 140(1)), plumbing one or more network interfaces, configuring devices, etc. These operations put the zone 140(1) into the Ready state.

In one embodiment, as part of the establishment process, ZoneADMD 162(1) also checks the sensitivity labels of other zones. Specifically, ZoneADMD 162(1) queries the kernel 150 for the sensitivity labels of all of the other zones in the system. Since ZoneADMD 162(1) executes in the global zone 130 and not in one of the zones 140, it is allowed to obtain information pertaining to all of the zones in the system. After ZoneADMD 162(1) has the sensitivity labels of all of the zones in the system, it checks each sensitivity label to determine whether there are any zones that are dominated by zone 140(1). In the current example, zone 140(1) has a sensitivity label of "secret Iraq" while zone 140(2) has a sensitivity label of "public Iraq". Since "secret" is higher than "public" in the sensitivity hierarchy, and since both labels specify "Iraq", the sensitivity label of zone 140(1) dominates the sensitivity label of zone 140(2). Given this situation, it may be desirable to give the processes in zone 140(1) (which have a higher sensitivity level) access to at least a portion of the file system of zone 140(2) (which has a lower sensitivity level).

Figure 2B:
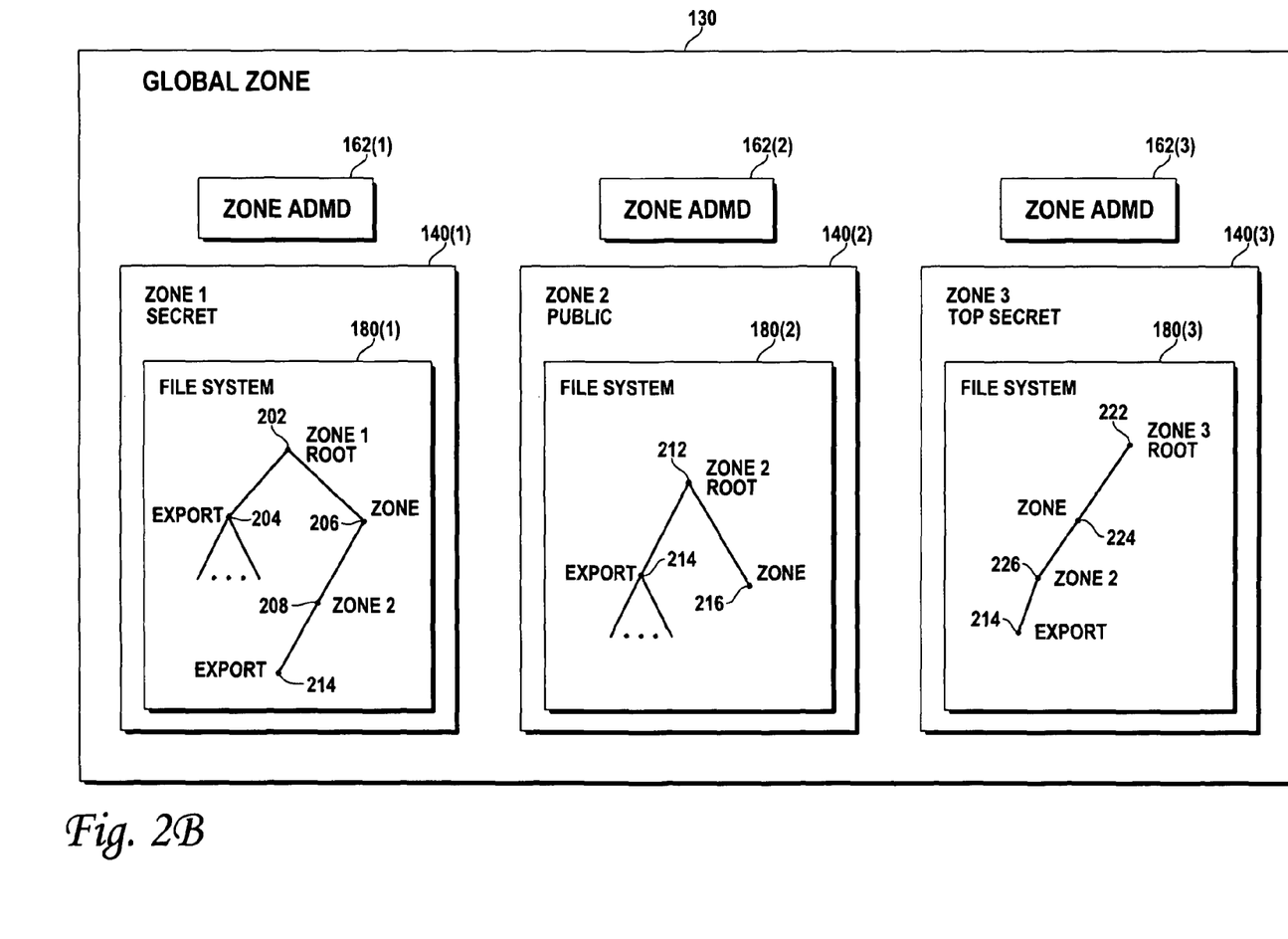

In response to this determination, ZoneADMD 162(1) checks the file system 180(2) of zone 140(2) to determine whether there is any portion of the file system 180(2) that is exportable to other zones. In one embodiment, ZoneADMD 162(1) checks for an Export directory, which the file system 180(2) of zone 140(2) has. Upon finding the Export directory 214, ZoneADMD 162(1) incorporates that directory 214 into the file system 180(1) of zone 140(1). In one embodiment, to do so, ZoneADMD 162(1) creates a Zone2 directory under the Zone directory 206 of file system 180(1), and mounts the Export directory 214 onto the Zone2 directory (thereby using Zone2 as a mount point). The result is shown in FIG. 2B, wherein the file system 180(1) of zone 140(1) has been updated to include a Zone2 directory 208 upon which the Export directory 214 has been mounted. In one embodiment, this mount is a LOFS mount. An advantage of a LOFS type of mount is that it does not require the contents of the Export directory 214 of file system 180(2) to be copied into the file system 180(1) of zone 140(1). Rather, the LOFS mount acts as a reference to the Export directory 214 of file system 180(2) so that when a process in zone 140(1) accesses the Export directory 214 in file system 180(1), it is redirected to the Export directory 214 of file system 180(2). In this way, there is no need to replicate or synchronize multiple copies of the Export directory 214. In one embodiment, to prevent the downgrade of information, ZoneADMD 162(1) makes the Zone2 mount point 208 a read-only mount. This prevents the processes in zone 140(1) from writing any information (which may be "secret" information) into the Export directory 214, which in turn, precludes the processes in zone 140(2) from being able to access any "secret" information that might otherwise have been written into the Export directory 214.

By incorporating the Export directory 214 of the file system 180(2) of zone 140(2) into the file system 180(1) of zone 140(1) in the above manner, information in the file system 180(2) of zone 140(2) is now made accessible to the processes of zone 140(1). In effect, file access control is enforced because the files and directories of the Export directory 214 in zone 140(2) (which have a lower sensitivity level) are now made accessible to the processes of the zone 140(1) (which have a higher sensitivity level). This file access control is achieved without violating the isolation aspect of zone 140(1). Since the Export directory 214 of the file system 180(2) of zone 140(2) is now part of the file system 180(1) of zone 140(1), when the processes in zone 140(1) access the Export directory 214, they are really just accessing a portion of the file system 180(1) of their own zone 140(1); thus, the isolation aspect of zone 140(1) is preserved.

In one embodiment, in addition to checking for zones that are dominated by zone 140(1), ZoneADMD 162(1) also checks for zones that dominate zone 140(1). Specifically, ZoneADMD 162(1) checks each sensitivity label to determine whether there are any zones that have sensitivity labels that dominate the sensitivity label of zone 140(1). In the current example, zone 140(3) has a sensitivity label of "top secret Iraq" while zone 140(1) has a sensitivity label of "secret Iraq". Since "top secret" is higher than "secret" in the sensitivity hierarchy, and since both labels specify "Iraq", the sensitivity label of zone 140(3) dominates the sensitivity label of zone 140(1). Given this situation, it may be desirable to give the processes in zone 140(3) (which have a higher sensitivity level) access to at least a portion of the file system of zone 140(1) (which has a lower sensitivity level).

Figure 2C:
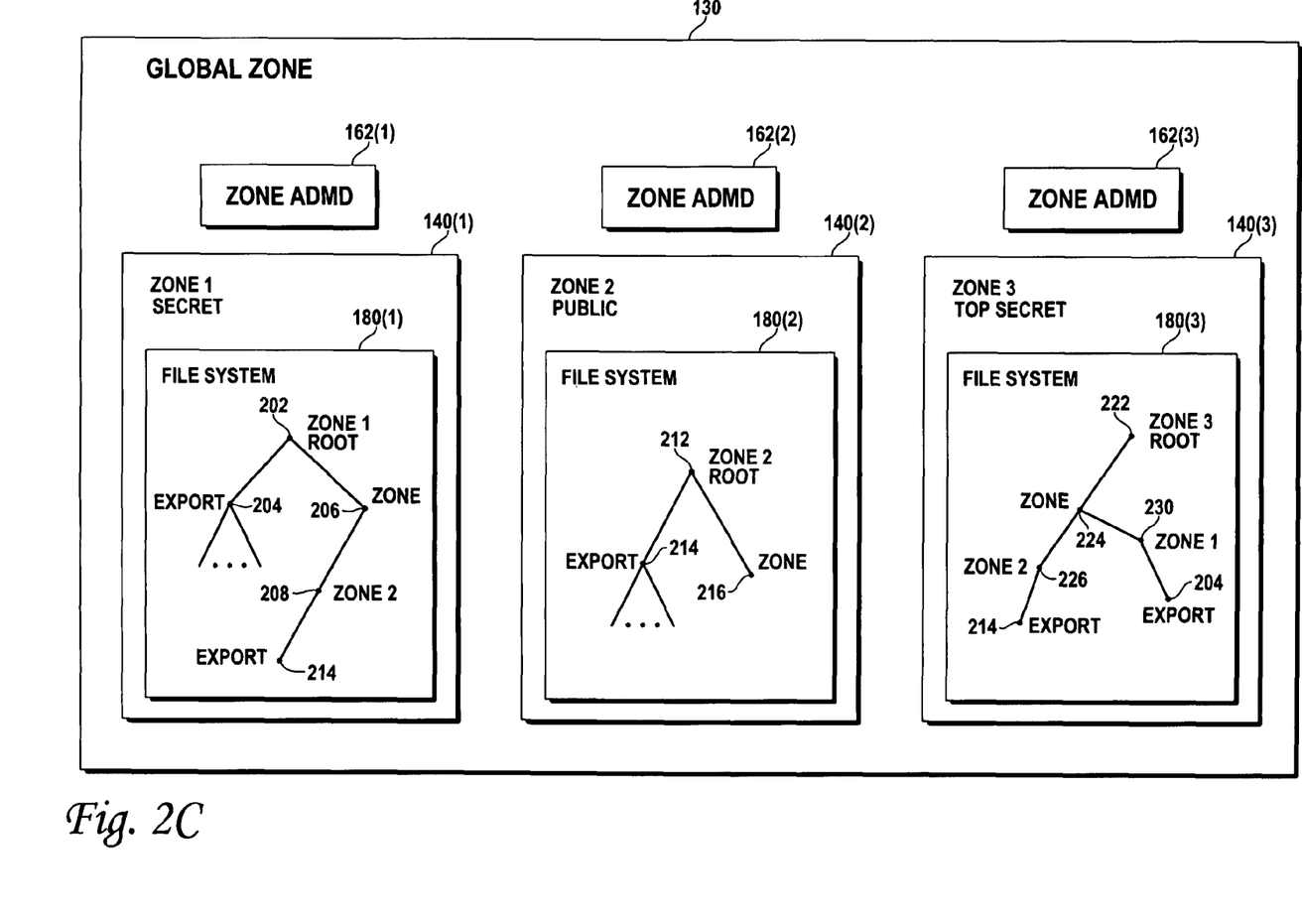

In response to this determination, ZoneADMD 162(1) checks the file system 180(1) of zone 140(1) to determine whether there is any portion of the file system 180(1) that is exportable to other zones. In one embodiment, ZoneADMD 162(1) checks for an Export directory, which the file system 180(1) of zone 140(1) has. Upon finding the Export directory 204, ZoneADMD 162(1) incorporates that directory 204 into the file system 180(3) of zone 140(3). In one embodiment, to do so, ZoneADMD 162(1) creates a Zone1 directory under the Zone directory 224 of file system 180(3), and mounts the Export directory 204 onto the Zone 1 directory (thereby using Zone1 as a mount point). The result is shown in FIG. 2C, wherein the file system 180(3) of zone 140(3) has been updated to include a Zone1 directory 230 upon which the Export directory 204 has been mounted. In one embodiment, this mount is a LOFS mount, which acts as a reference to the Export directory 204 of file system 180(1) so that when a process in zone 140(3) accesses the Export directory 204 in file system 180(3), it is redirected to the Export directory 204 of file system 180(1). In one embodiment, to prevent the downgrade of information, ZoneADMD 162(1) makes the Zone1 mount point 230 a read-only mount. This prevents the processes in zone 140(3) from writing any information (which may be "top secret" information) into the Export directory 204, which in turn, precludes the processes in zone 140(1) from being able to access any "top secret" information that might otherwise have been written into the Export directory 204.

By incorporating the Export directory 204 of the file system 180(1) of zone 140(1) into the file system 180(3) of zone 140(3) in the above manner, information in the file system 180(1) of zone 140(1) is made accessible to the processes of zone 140(3). In effect, file access control is enforced because the files and directories of the Export directory 204 in zone 140(1) (which have a lower sensitivity level) are now made accessible to the processes of zone 140(3) (which have a higher sensitivity level). This file access control is achieved without violating the isolation aspect of zone 140(3). Since the Export directory 204 of the file system 180(1) of zone 140(1) is now part of the file system 180(3 of zone 140(3), when the processes in zone 140(3) access the Export directory 204, they are really just accessing a portion of the file system 180(3) of their own zone 140(3); thus, the isolation aspect of zone 140(3) is preserved.

Notice that implementing file access control in the above manner does not require a sensitivity label to be stored with each file. Rather, the sensitivity label is associated with a zone, and applied to all of the directories and files in the file system of that zone. Thus, this file access control approach does not require a customized file system that allows a sensitivity label to be stored with each file but rather can be implemented with most standard types of file systems. Also, notice that the sensitivity labels need not be checked every time a file is accessed but rather only at the time that a zone is established. Because of this, system overhead is significantly reduced. Thus, with this approach, it is possible to implement file access control simply and efficiently.

Enforcement of Zone Boundaries

As noted previously, in one embodiment, it is the kernel 150 that enforces the zone boundaries. In this regard, the kernel 150 ensures that the processes within a zone 140 are not allowed to access or affect anything outside of the zone. This includes ensuring that the processes within a zone 140 are allowed to access only the files and directories that are within the file system of that zone. In one embodiment, the kernel 150 does this by associating the zone ID (assigned at the time of zone creation) with each process executing within a zone 140.

Specifically, whenever a process is started within a zone 140, the kernel 150 ascertains the ID of the zone, and associates that ID with the process. When a process requests access to a file or a directory, the kernel 150 determines the zone ID associated with that process. The kernel 150 then accesses the data structure associated with that zone 140, and determines the path to the root of the file system for that zone 140. The kernel 150 then determines whether the requested file or directory has a path that is under the root of the file system for that zone 140. If it is, then access to the file or directory may be granted (if other conditions, such as having the proper privileges, are met). Otherwise, access is denied. By doing so, the kernel 150 ensures that a process is allowed to access only the files and directories that are part of the file system of the zone in which the process is executing.

Hardware Overview

Figure 5:
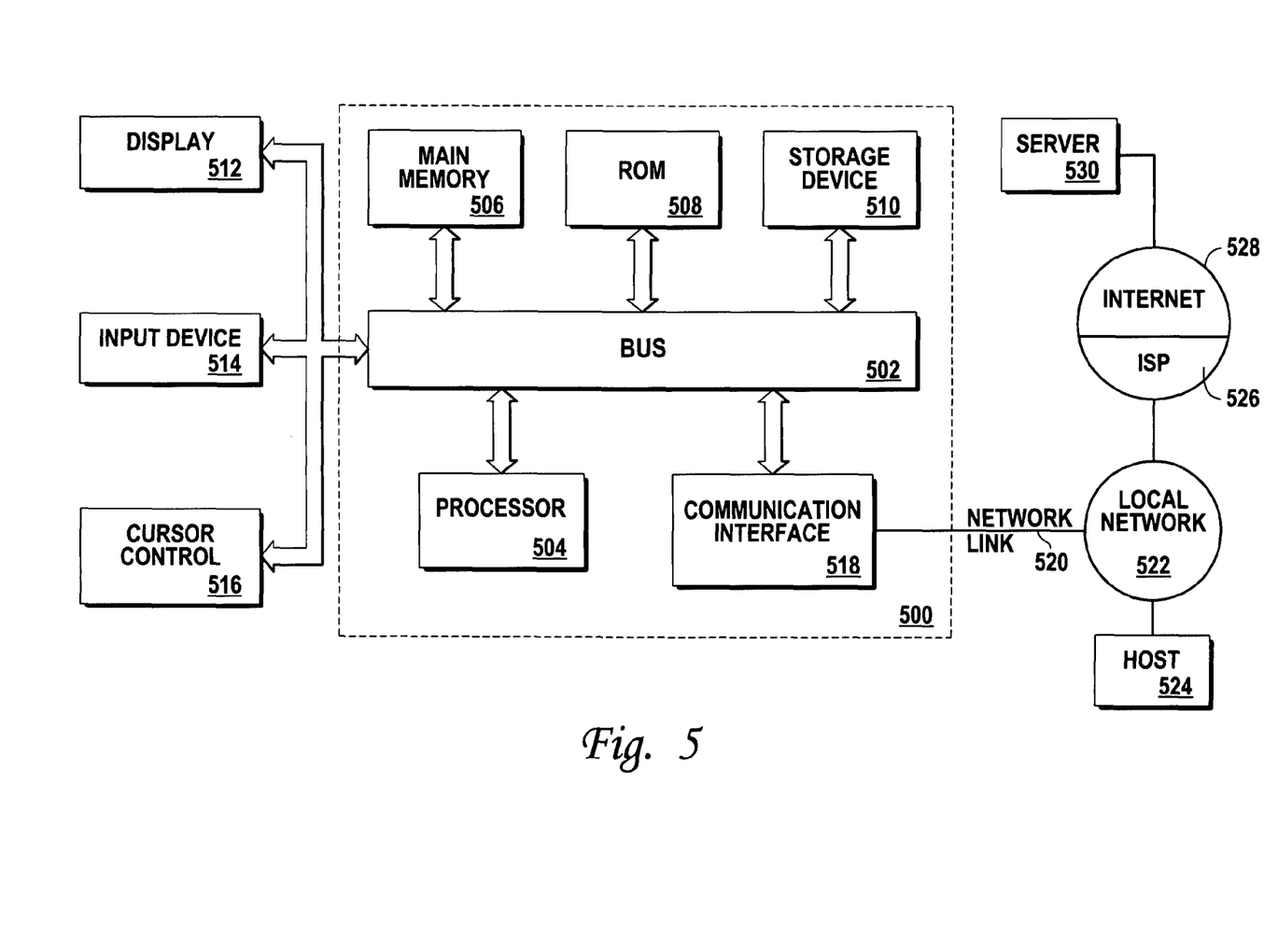
FIG. 5 is a block diagram of a general purpose computer system in which one embodiment of the present invention may be implemented.

In one embodiment, the ZoneADMD 162 and the OS, which includes kernel 150, may take the form of sets of instructions that are executed by one or more processors. If they take the form of sets of instructions, FIG. 5 shows a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc. to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   creating a first container within a global operating system environment,
      wherein the first container is assigned a first sensitivity label,
      wherein the first container comprises a first isolated execution environment in the global operating system environment, wherein the first isolated execution environment comprises a first file system and a first logical network interface,
      wherein the first sensitivity label comprises a first sensitivity level of a predefined hierarchical plurality of sensitivity levels and a first category, and
      wherein the first container serves to prevent processes executing within the first isolated execution environment from accessing files that are not part of the first file system;
   determining that the global operating system environment comprises a second container,
      wherein the second container is assigned a second sensitivity label,
      wherein the second container comprises a second isolated execution environment in the global operating system environment, wherein the second isolated execution environment comprises a second file system and a second logical network interface,
      wherein the second sensitivity label comprises a second sensitivity level of the predefined hierarchical plurality of sensitivity levels and a second category, and
      wherein the second container serves to prevent processes executing within the second isolated execution environment from accessing files that are not part of the second file system;
   determining that the second sensitivity level is higher in the hierarchical plurality of sensitivity levels than the first sensitivity level and that the first category matches the second category, thereby indicating that processes executing within the first container should be allowed to access at least a particular portion of the second file system associated with the second container; and
   in response to a determination that the second sensitivity level is higher in the hierarchical plurality of sensitivity levels than the first sensitivity level and that the first category matches the second category, incorporating the at least a particular portion of the second file system into the first file system to enable one or more processes executing within the first container to access the particular portion of the second file system.

2. The method of claim 1, wherein incorporating the particular portion of the second file system into the first file system comprises:
   mounting the particular portion of the second file system onto a particular mount point in the first file system to give rise to a file system mount.

3. The method of claim 2, wherein incorporating the particular portion of the second file system into the first file system further comprises:
   designating the file system mount as a read-only mount such that processes executing within the first container may read from, but not write to, files within the file system mount.

4. The method of claim 2, wherein the file system mount is a loopback file system (LOFS) mount.

5. The method of claim 1, wherein the first and second containers are operating system partitions.

6. The method of claim 1, further comprising:
   determining that a third container within the global operating system environment has a third sensitivity label which dominates the first sensitivity label, the third container having a third file system associated therewith, wherein the third sensitivity label comprises a third category, and wherein the third category matches the first category; and
   incorporating at least a certain portion of the first file system into the third file system to enable one or more processes executing within the third container to access the certain portion of the first file system.

7. The method of claim 6, wherein incorporating the certain portion of the first file system into the third file system comprises:
   mounting the certain portion of the first file system onto a particular mount point in the third file system to give rise to a file system mount.

8. The method of claim 7, wherein incorporating the certain portion of the first file system into the third file system further comprises:
   designating the file system mount as a read-only mount such that processes executing within the third container may read from, but not write to, files within the file system mount.

9. The method of claim 6, wherein the file system mount is a loopback file system (LOFS) mount.

10. The method of claim 1, wherein the first, second, and third containers are operating system partitions.

11. A machine readable storage medium having instructions stored thereon which, when executed by one or more processors, cause the one or more processors to perform the operations of:
   creating a first container within a global operating system environment,
      wherein the first container is assigned a first sensitivity label,
      wherein the first container comprises a first isolated execution environment in the global operating system environment, wherein the first isolated execution environment comprises a first file system and a first logical network interface,
      wherein the first sensitivity label comprises a first sensitivity level of a predefined hierarchical plurality of sensitivity levels and a first category, and wherein the first container serves to prevent processes executing within the first isolated execution environment from accessing files that are not part of the first file system;

determining that the global operating system environment includes comprises a second container,
- wherein the second container is assigned a second sensitivity label,
- wherein the second container comprises a second isolated execution environment in the global operating system environment, wherein the second isolated execution environment comprises a second file system and a second logical network interface,
- wherein the second sensitivity label comprises a second sensitivity level of the predefined hierarchical plurality of sensitivity levels and a second category, and
- wherein the second container serves to prevent processes executing within the second isolated execution environment from accessing files that are not part of the second file system;

determining that the second sensitivity level is higher in the hierarchical plurality of sensitivity levels than the first sensitivity level and that the first category matches the second category, thereby indicating that processes executing within the first container should be allowed to access at least a particular portion of the second file system associated with the second container; and in response to a determination that the second sensitivity level is higher in the hierarchical plurality of sensitivity levels than the first sensitivity level and that the first category matches the second category, incorporating the at least a particular portion of the second file system into the first file system to enable one or more processes executing within the first container to access the particular portion of the second file system.

12. The machine readable storage medium of claim 11, wherein the incorporating the particular portion of the second file system into the first file system comprises:
   mounting the particular portion of the second file system onto a particular mount point in the first file system to give rise to a file system mount.

13. The machine readable storage medium of claim 12, wherein incorporating the particular portion of the second file system into the first file system further comprises:
   designating the file system mount as a read-only mount such that processes executing within the first container may read from, but not write to, files within the file system mount.

14. The machine readable storage medium of claim 12, wherein the file system mount is a loopback file system (LOFS) mount.

15. The machine readable storage medium of claim 11, wherein the first and second containers are operating system partitions.

16. The machine readable storage medium of claim 11, wherein the instructions cause the one or more processors to further perform the operations of:
   determining that a third container within the global operating system environment has a third sensitivity label which dominates the first sensitivity label, the third container having a third file system associated therewith, wherein the third sensitivity label comprises a third category, and wherein the third category matches the first category; and
   incorporating a least a certain portion of the first file system into the third file system to enable one or more processes executing within the third container to access the certain portion of the first file system.

17. The machine readable storage medium of claim 16, wherein incorporating the certain portion of the first file system into the third file system comprises:
   mounting the certain portion of the first file system onto a particular mount point in the third file system to give rise to a file system mount.

18. The machine readable storage medium of claim 17, wherein incorporating the certain portion of the first file system into the third file system further comprises:
   designating the file system mount as a read-only mount such that processes executing within the third container may read from, but not write to, files within the file system mount.

19. The machine readable storage medium of claim 16, wherein the file system mount is a loopback file system (LOFS) mount.

20. The machine readable storage medium of claim 11, wherein the first, second, and third containers are operating system partitions.

* * * * *

UNITED STATES PATENT AND TRADEMARK OFFICE
CERTIFICATE OF CORRECTION

| | | |
|---|---|---|
| PATENT NO. | : 7,885,975 B2 | Page 1 of 1 |
| APPLICATION NO. | : 11/361437 | |
| DATED | : February 8, 2011 | |
| INVENTOR(S) | : Glenn T. Faden | |

It is certified that error appears in the above-identified patent and that said Letters Patent is hereby corrected as shown below:

In Claim 11, Column 17 (line 6), "includes" should be deleted.

Signed and Sealed this
Nineteenth Day of April, 2011

David J. Kappos
*Director of the United States Patent and Trademark Office*